(12) United States Patent
Kader

(10) Patent No.: US 6,524,094 B1
(45) Date of Patent: Feb. 25, 2003

(54) DEVICE FOR FORMING A FOOD MASS FOR PRODUCING A FOOD PRODUCT AND A METHOD FOR SUCH FORMING

(76) Inventor: Dana Kader, Fagelvägen 23, Märsta, SE-19533 (SE)

(*) Notice: Subject to any disclaimer, the term of this patent is extended or adjusted under 35 U.S.C. 154(b) by 0 days.

(21) Appl. No.: 09/674,544
(22) PCT Filed: May 11, 1999
(86) PCT No.: PCT/SE99/00816
§ 371 (c)(1), (2), (4) Date: Jan. 8, 2001
(87) PCT Pub. No.: WO99/60862
PCT Pub. Date: Dec. 2, 1999

(30) Foreign Application Priority Data

May 11, 1998 (SE) .............................. 9801662

(51) Int. Cl.[7] .............................. B29C 45/40
(52) U.S. Cl. ................ 425/556; 425/577; 425/812
(58) Field of Search ................ 425/215, 217, 425/556, 528, 533, 444, 812, 577

(56) References Cited

U.S. PATENT DOCUMENTS 4,091,069 A * 5/1978 Allen .......................... 425/812
4,257,145 A   3/1981 Bovino
5,246,721 A * 9/1993 Kerkonian ................... 425/444

FOREIGN PATENT DOCUMENTS

| AU | 81100/91 | 2/1992 |
| DE | 3939035 | 5/1991 |
| GB | 2212096 | 7/1989 |

* cited by examiner

Primary Examiner—Tim Heitbrink
(74) Attorney, Agent, or Firm—Dilworth & Barrese

(57) ABSTRACT

A device and a method for forming a food mass on a spit (2) for preparation of a hollow food product is based upon the use of a cylinder (5) having a cavity and a spit (2) about which the food mass is to be formed. The cylinder (5) and the spit (2) are movable relative to each other along a longitudinal axis of the cylinder. A hole (8) is provided for introducing the food mass into the space formed between the spit and an inner wall of the cylinder. The device has a piston (6) receivable in the cavity of the cylinder. The piston (6) and cylinder (5) are relatively movable in the longitudinal direction of the cylinder. More specifically, the cylinder (5) and an assembly consisting of spit (2)/piston (6) are movable relative to each other in the longitudinal direction of the cylinder between at least two positions, namely a first position, in which the space about the spit is located at least partially in the cavity of the cylinder so as to be filled with the food mass and a second position, in which the spit is located at least partly liberated by the cylinder (5) for removal of the spit with its associated food product.

18 Claims, 8 Drawing Sheets

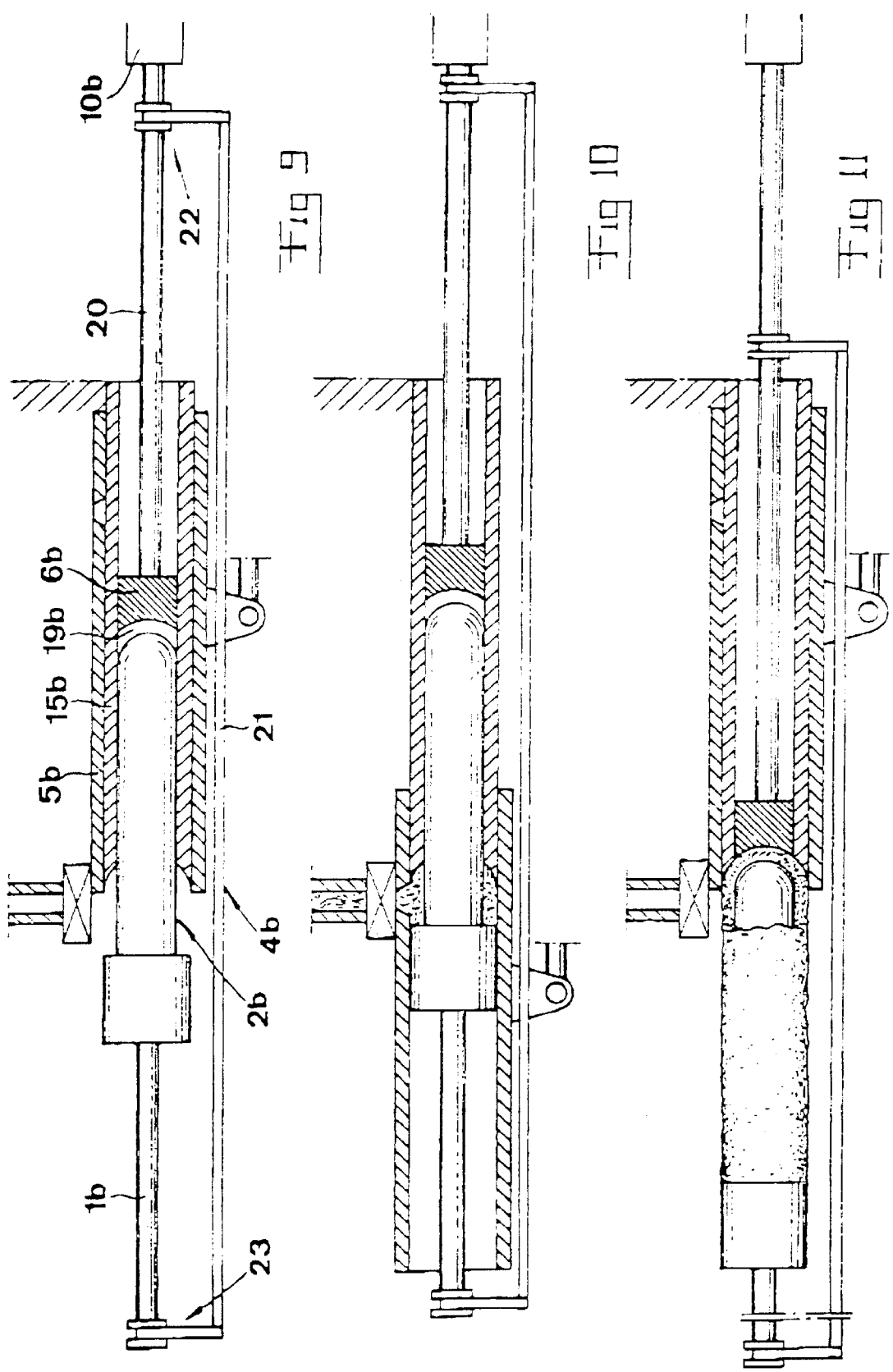

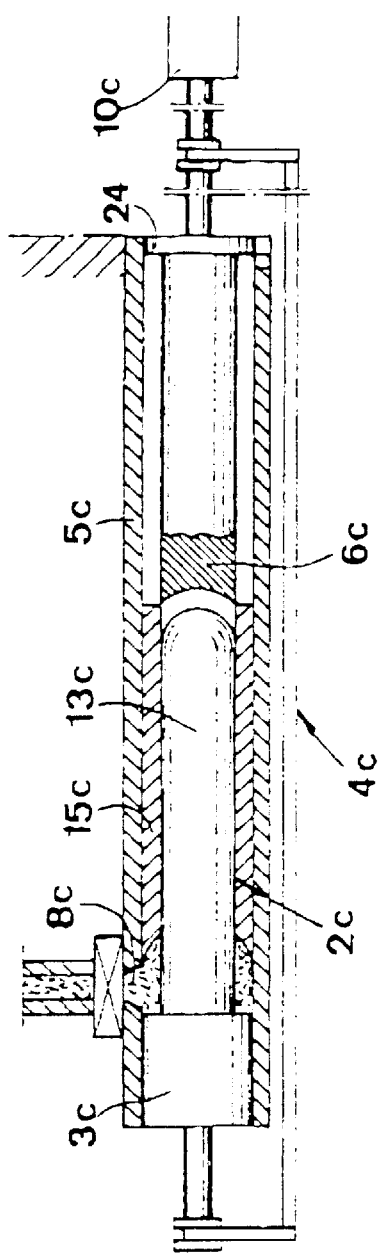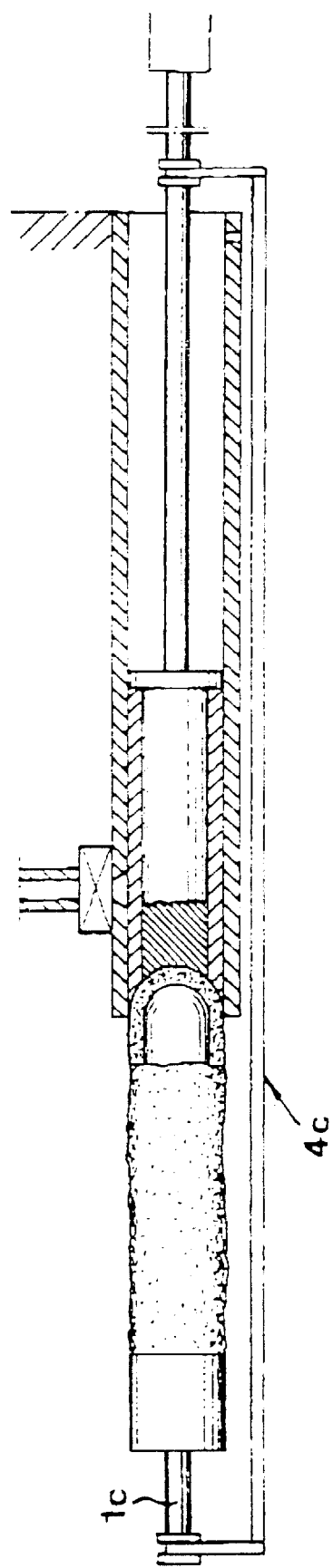

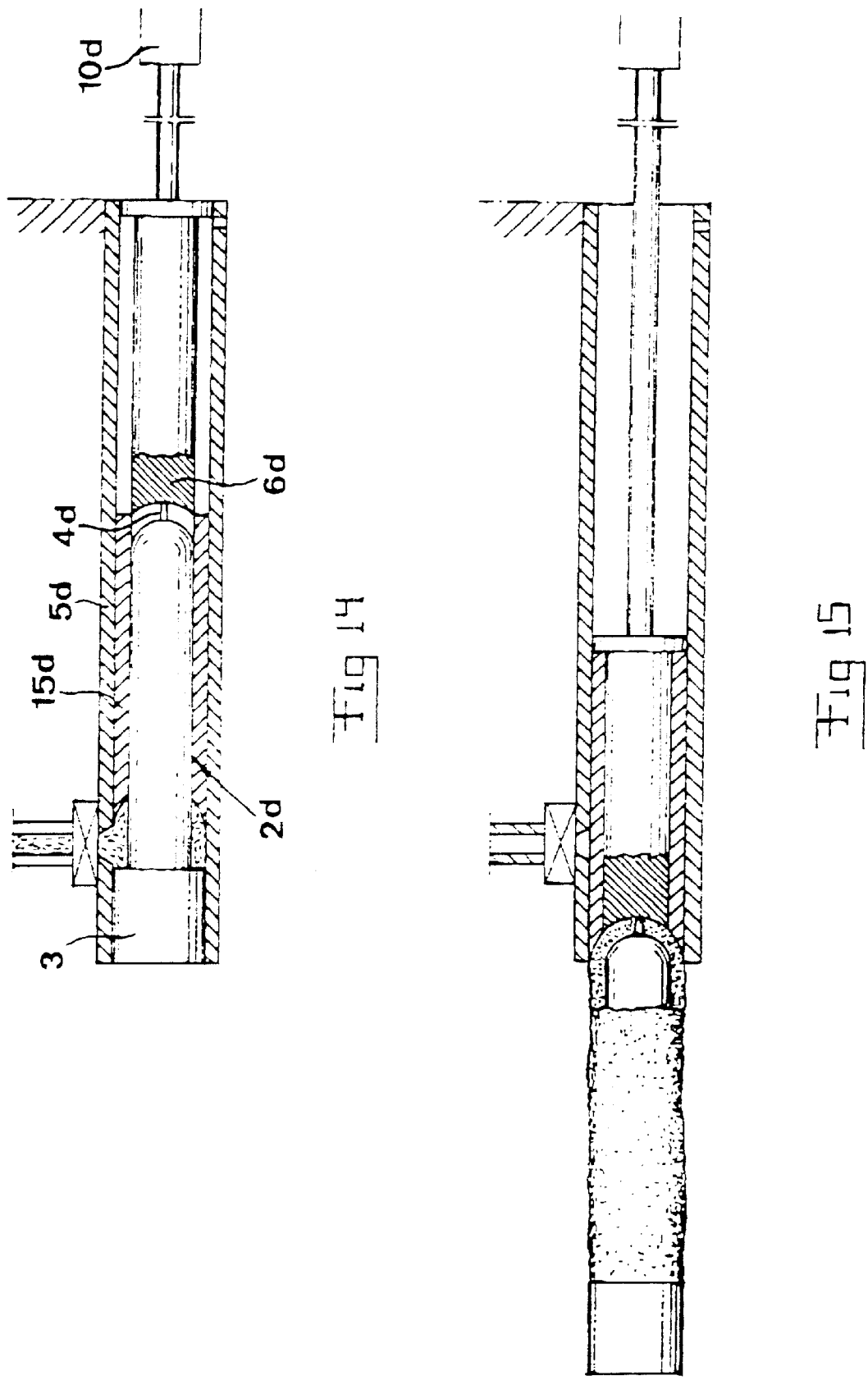

DEVICE FOR FORMING A FOOD MASS FOR PRODUCING A FOOD PRODUCT AND A METHOD FOR SUCH FORMING

TECHNICAL FIELD OF THE INVENTION AND PRIOR ART

The present invention relates to a device for forming a food mass for preparation of food products. Furthermore, the invention relates to a method for such forming.

The food products which are formed on spits can depending on the present food mass be adapted to be eaten directly or after removal from the spits. Generally, it is however intended that the food products are to be subject to further treatment, such as to be grilled while they remain on the spits. Another type of heat treatment than grilling is of course also be possible. The food mass which is used according to the invention can be of arbitrary kind. However, it must have such a consistency that it can be applied about the spit in a manner which is rational to a reasonable extent. Generally, the point is that it should be possible by pumping, pressing or the like to bring the food mass in question into its position via channels, openings or the like. The food mass preferably consists of farce, for instance farce of meat, fish, poultry, vegetables etc. As a particularly preferred example may be mention a farce with a consistency similar to that of farce for preparation of meatballs or kebab. The prepared food product is intended to comprise a cavity, which for instance can be filled with vegetables, sauce or dressing, and can be served on a plate, wrapped in a flat bread or other kind of bread.

It is known to apply the food mass on spits by placing the spits in partially cylindrical troughs, into which the food mass is filled, The spits are thereafter pulled out of these troughs and are being subjected to further suitable treatment. Since these partially cylindrical troughs have a considerable opening sideways, the application of the food mass about the spits will be unsatisfying, even if attempts are being made to compact the food mass in the partially cylindrical troughs by means of implements such as spoons or the like. Since these partially cylindrical troughs have a considerable opening sideways, there is a risk that the food mass formed on the spits will be destructed when the spits are being pulled out of the troughs. It is also known to press food mass about a spit into a space about the spit by means of a press function, whereupon the spit with the associated food product formed about the same is pulled out Also in this case, there is a risk that the formed food product will be destructed.

OBJECT OF THE INVENTION

The object of the present invention is to develop further known technique in order to obtain an improved quality and uniformity concerning the formed food products and a reduction of the risk that the spits will be negatively effected when they are being removed after the forming has been effected.

SUMMARY OF THE INVENTION

According to the invention this object is achieved, as far as the device is concerned, by the features described herein. The relative mobility between the cylinder and the spit/piston of the assembly results in a very secure removal of the prepared food products after they have been formed in the device.

According to a particular preferred embodiment, the sleeve will gradually provide an increasing space for the food mass being filled so that problems associated with air escape are reduced or eliminated.

Further advantageous features, as far as the device and the method according to the invention are concerned, are dealt with in the subsequent description and the remaining claims.

BRIEF DESCRIPTION OF THE DRAWINGS

With reference to the accompanying drawings a closer description of embodiments of the invention, given as examples, will follow below.

In the drawings:

FIGS. 9–11 are views similar to FIG. 6–8 but showing a further alternative, FIGS. 12 and 13 are partly cut longitudinal sectional views showing a further alternative embodiment according to the invention, FIGS. 14 and 15 are views similar to those in FIG. 12 and 13 but showing a variant.

DETAILED DESCRIPTION OF PREFERRED EMBODIMENTS

Figure 1:
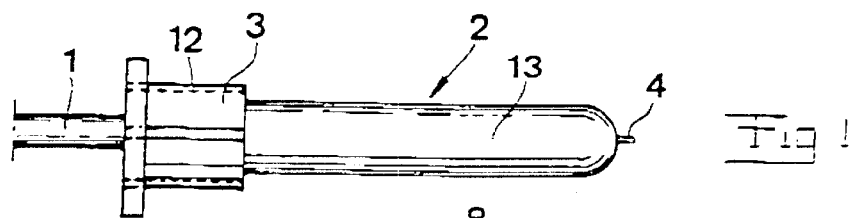
FIG. 1 is a schematic side view of a spit or skewer according to the invention.
Figure 2:
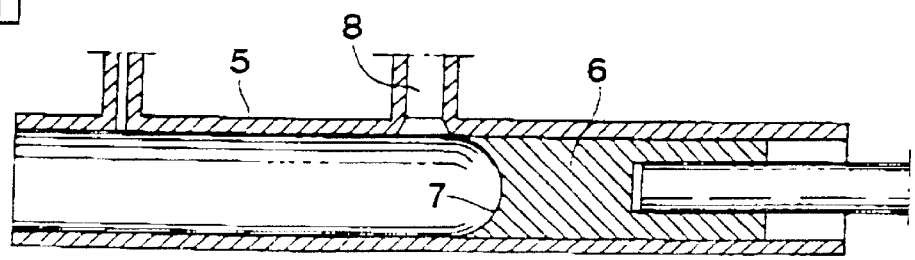
FIG. 2 is a schematic longitudinal section through a hollow cylinder comprised in the device, with a piston axially displaceable in this cylinder.
Figure 3:
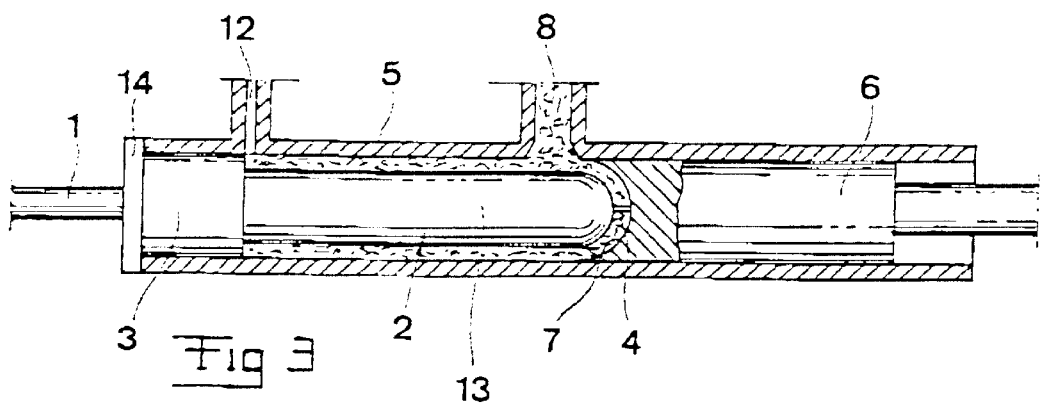
FIG. 3 is a view showing the skewer inserted in the cylinder. the food mass being filled in the space between the spit and the inner wall of the cylinder.
Figure 4:
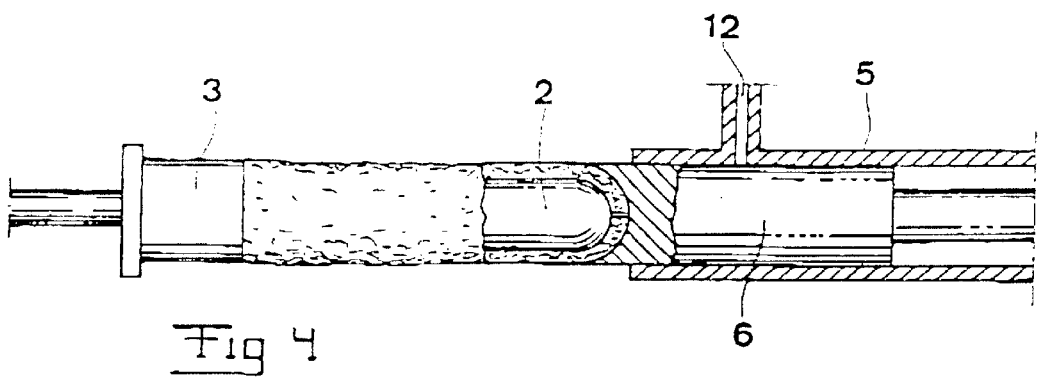
FIG. 4 is a view showing how the skewer provided with food mass is fed out of the cylinder by relative displacement of the cylinder and the piston, a spacing member being arranged between the piston and the spit, for instance in the end of the skewer.

A rod 1 is provided with a skewer 2 at one end, which skewer has a shoulder or piston-like collar 3 at its inner end and a spacing member 4 at its outer end. In the example, this spacing member has the form of a pin or a tip having a cross section which is essentially smaller than the cross section of the section 13 of the skewer 2, about which food mass is to be formed The spit 2 constitutes a mould insert for the food mass which is to be formed about the spit for, as an example, subsequent grilling. The food receiving section 13 of the spit 13 can have a completely arbitrary cross-section, among which may be mentioned circular, oval or polygonal cross-sections. In the embodiment, the food mass receiving section of the spit is considered to have a circular cross-sectional form and it has a rounded end, for instance a spherically rounded end, from the centre of which the spacing member 4 extends in the elongation of the spit.

The device comprises a hollow cylinder 5, the inner cavity of which has a cross-sectional shape corresponding to the external periphery of the collar 3, which collar has a certain axial extension so as to function as a guiding member when the spit 2 is inserted into the cylinder and secure that the spit is received in the cylinder with an all around uniform free space to the inner wall of the cylinder, corresponding to the desired wall thickness of the food product. In the embodiment, the hollow cylinder 5 is formed as a circular cylinder in correspondence with the circular shape of the spit, even though this, as previously pointed out, not is any necessity.

A piston 6 is tightly and slidably carried in the cylinder 5 and has, in the embodiment, a cup-shaped end surface 7, for instance spherically cup-shaped, the radius of which is adapted to the rounded end of the skewer 2 so as to provide, when in contact with the spacing member 4, an interspace of a kind corresponding to the desired wall thickness of the food product. A filler hole 8 extends from a container 9, shown in FIG. 5, for feeding food mass into the cylinder 5 with the skewer 2 received in the cylinder, so that the food mass fills up the space between the spit and the inner wall of the cylinder, from the end surface 7 of the piston and up to the adjacent, axially directed end surface of the collar 3.

Figure 5:
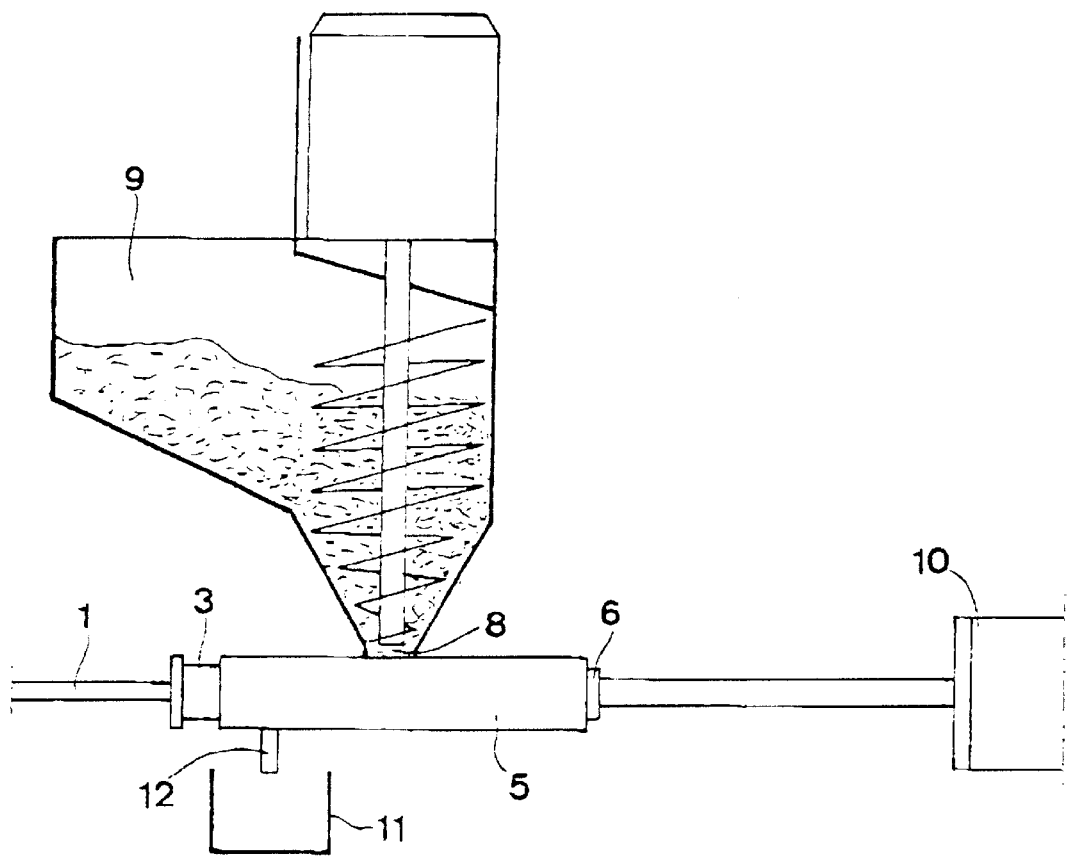
FIG. 5 is a schematic view illustrating a more complete view of the device.

The spit 2, with the food mass formed thereon, is thereafter released from the cylinder by a relative displacement of the cylinder 5 and the piston 6, with the latter being in contact with the spacing member 4. The relative displacement is carried out by means of an arbitrary source of power, for instance hand power or, as indicated in FIG. 5, by means of a power outputting driving means 10. This means operates between the piston 6 and the cylinder 5 in such a way that either the piston is driven for pushing the spit out of a stationary cylinder 5 or the cylinder 5 is driven for pulling away from the filled spit with the piston 6 acting as a stationary holder-on. The driving means 10 can be arranged to operate between the piston and the cylinder or between the framework of the device and the piston or the cylinder. The driving means 10 can be of arbitrary kind; it may consist of a motor or a piston/cylinder unit 10 using air pressure or oil pressure, electricity or be purely mechanical in the form of a pretensioning spring which is released so as to set free the spit filled with food mass.

One or several air channels 12 can be arranged for evacuating the air present in the space between the spit and the cylinder, during the filling of food mass. Such openings can for instance be axially formed in the periphery of the collar 3, as indicated with dashed lines in FIG. 1, or extend through the wall of the cylinder, possibly being in connection with the storage container for feeding back surplus food mass during the filling of the cylinder, or leading to a collecting vessel 11 as in FIG. 5.

The filling of food mass about the skewer 2 can be carried out in two principly different ways: on one hand in that a filler hole leads to the space for filling formed between the spit and the cylinder, with the piston 6 acting as a stationary holder-on being in contact with the spacing member 4 and forming an end wall of the filler hole extending into the cylinder, and on the other hand in that the filler hole ends inside the skewer for feeding a stipulated volume of food mass, which food mass is advanced by the axial displacement of the piston so as to fill up the space and be formed about the spit 2.

In one embodiment of the device, the piston 6 is arranged to rotate during the axial movement for feeding the spit filled with food mass out of the cylinder, in order thereby to facilitate the releasing of the formed food mass from the end surface of the piston. In another embodiment, channels are arranged in the piston so as to coat the inner side of the cylinder with oil or grill oil before the next filling of food mass, which likewise facilitates the releasing of the mass when the spit with the mass formed thereon is pushed out.

All the parts, i.e. the spit 2. the cylinder 5 and the piston 6 can be made of stainless steel, but the piston and/or the cylinder can also be made of a synthetic material which is durable and suitable for machine washing.

The spacing member 4 has a narrowing or conical shape with a a rounded or flat tip, and the end surface of the piston can be formed with a, not shown, receiving seat for the distance member. It is here also pointed out that it would be possible to form the distance member 4 on the piston 6 instead of on the spit 2.

In an alternative embodiment, the skewer is guided for centred insertion into the cylinder under simultaneous filling of food mass, so that the spit is filled with mass at the same time as a member 14. for instance a protruding flange, which is intended to limit the insertion of the spit 2 into the cylinder 5, will get in contact with the cylinder, for instance at one end of it.

With the shown device and method for forming a food mass about a spit, a food product, for instance grilled, shaped as a hollow cylinder can be prepared, which food product is closed at one end and has a central cavity for filling with vegetables, sauce, dressing, mached potatoes etc. The food product can be served on a plate, wrapped in a flat bread or inserted in a bread baked with a hole for the food product, and is suitable for restaurants as well as for "street kitchens". The device admits cooking of fresh primary products in direct connection with the serving occasion, but can also be used industrially for distribution in frozen condition.

Figure 6:
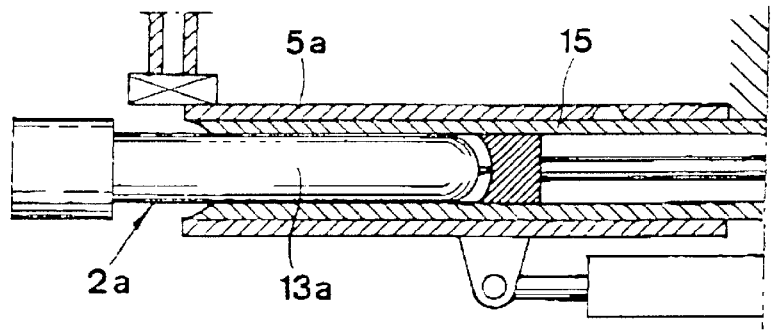
FIGS. 6–8 are partly cut longitudinal sections illustrating an alternative embodiment of the device according to the invention.
Figure 7:
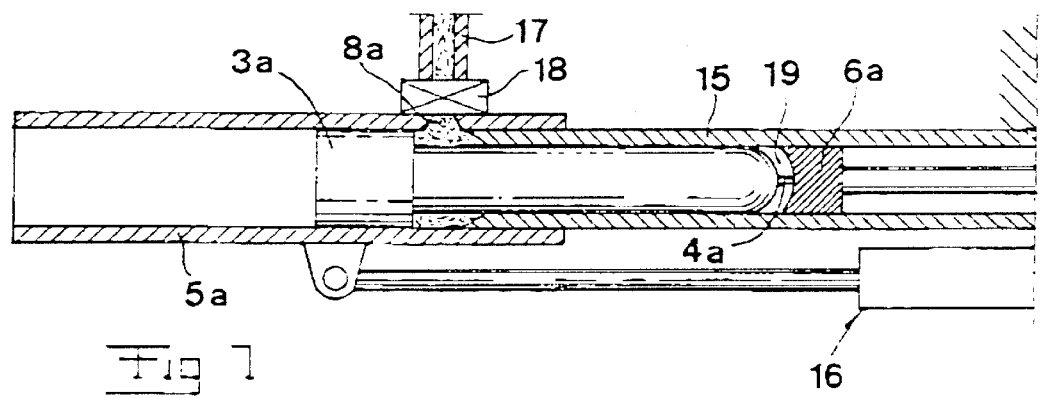
Figure 8:
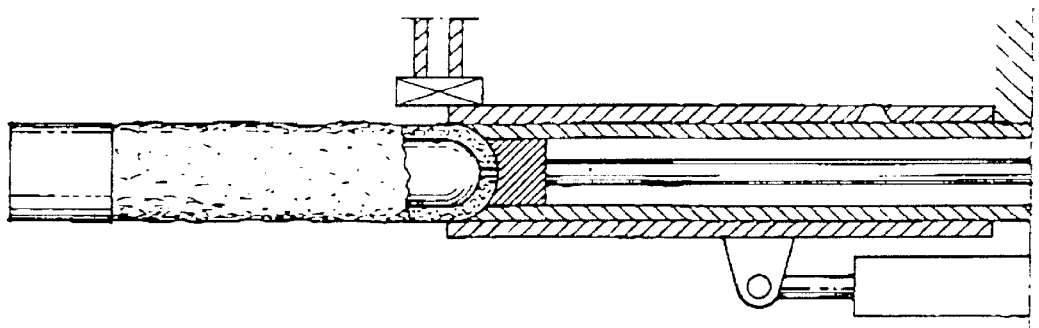

FIGS. 6–8 illustrate a variant, in the description of which, as far as possible, the same designations are used as in FIGS. 1–5, only with the addition of the letter a characteristic for the embodiment. The embodiment according to FIGS. 6–8 differs from the previous primarily in that it comprises a sleeve 15, which is receivable in the cavity of the cylinder 5a. The sleeve 15 and the cylinder 5a are relatively moveable in the longitudinal direction of the cylinder and the sleeve. The food mass receiving section 13a of the spit 2 is receivable inside the sleeve 15 with relative mobility between the spit and the sleeve. In the starting position for filling of food mass, shown in FIG. 7, the sleeve 15 is arranged to occupy essentially the whole of or at least a considerable part of the space between the spit 2a and the cylinder intended for receipt of mass about the spit 2a. Furthermore, the sleeve is arranged to gradually liberate, during the filling of food mass, the space about the spit intended for receipt of the food mass, under relative movement between the sleeve and the spit.

To be precise, the sleeve 15 is stationarily arranged in this embodiment, whereas the cylinder 5a is movable relative to the sleeve 15 by means of a driving means 16 operating between the cylinder 5a and the frame work of the device or directly between the cylinder 5a and the sleeve 15 As before, the piston 6a is movable relative to the cylinder 5a. To be more precise. the piston 6a is here located inside the sleeve 15, i.e. the sleeve is located between the piston 6a and the cylinder 5a. The rod 1 belonging to the spit 2a, which could be seen from the previous embodiment, has not been drawn out here. A filler hole 8a for food mass is arranged in the wall of the cylinder 5a. A filler tube is indicated at 17. This comprises an adjustable valve at one end.

It is pointed out that the sleeve sealingly connects to the inner wall of the cylinder 5a, and furthermore, the inside of the sleeve 15 sealingly connects to the outside of the food mass receiving section 13a of the spit 2a and also to the outside of the piston 6a.

In order to reach a starting position for filling, the cylinder 5a is run by the driving means 16 out to the position shown in FIG. 7, in which position the filler hole 8a in the cylinder 5a is directed in alignment with the filler tube 17. The valve 17 is coordinated with sealing means which sealingly connects to the outside of the cylinder 5a about the filler hole 8a. The spit 2a is inserted into the cylinder 5a in such a way that its section 13a extends into the sleeve 15. The collar 3a of the spit 2a is located at the side of the filler hole 8. The piston 6a and the spit 2a are adjusted in axial direction so that the filler hole 8 will be located between the end of the sleeve 15 and the side of the collar 3a facing said end of the sleeve 15. When the valve 18 now is opened, food mass will flow into the space about the section 13a of the spit. During the filing, the piston 6a and the spit 2a are gradually displaced, to the left in FIGS. 6–8, which implies that a gradually widening space is provided for the food mass, i.e., expressed in other words, that the sleeve 15, even though it is here stationary, can be said to gradually liberate the space about the spit 2a intended for food mass. Finally, the piston 6a/spit 2a reaches so far that the interspace 19 between the piston 6a and the outer end of the spit will also be filled with food mass. When the filling is completed, the cylinder 5a is pulled back by means of a driving means 16 to the position according to FIG. 8, whereupon the spit 2a can be removed, possibly after a final pushing movement of the piston 6a by means of a driving means associated with the piston, similar to that designated with 10 in FIG. 5. In this embodiment, the movement of the piston 6a is transferred to the spit 2a via a spacing member 4a by analogy with the previous embodiment.

Concerning its essential features, the variant in FIGS. 9–11 correspond to the embodiment just described with reference to FIGS. 6–8, However, a difference is present in the sense that no spacing member operating directly between the spit 2a and the piston 6a is provided here.

In FIGS. 9–11, the same designations as before are used with the addition of the letter b specific for the embodiment.

The spacing member occurring in the previous embodiments can be said to constitute a means for maintaining a predetermined relation between the spit and the piston during and/or after the application of the food mass about the spit. This means, generally designated 4b, is in the embodiment according to FIGS. 9–11 arranged to mechanically connect the spit and the piston 6b. As before, there is provided a driving means 10b capable of displacing the piston 6b inside the sleeve 16b and inside the cylinder 5b via intermediation of a piston stem 20. Here, the means for 4b comprises a connecting member 21, for instance in the form of a bar, which extends on the outside of the sleeve 15b and the cylinder 5b, and which at one of its ends 22 is connected to the piston 6b, in the example to the piston stem 20 to be more precise, in such a way that it is prevented from axial displacement. At its other end 23, the bar 21 is connected to the rod 1b associated with the spit 2b in such a way that it is prevented from axial displacement. The ends of the bar 21 can be connected to the rods 20 and 1b, respectively, in that the bar 21 comprises connecting means received between separate fixed shoulders on the rods. In order to make it easy to remove the spit 2b after the filling of mass, it is preferred that the bar 21 with its end designated with 23 has the form of a releasable connection, for instance a yoke, in which the rod 1b is laid so that the rod 1b by lifting can be brought out of engagement with the connecting means of the bar 21.

However, during the filling of the food mass this bar is intended to be connected between the spit 2b and the piston 6b so that the desired interspace 19b between them is always maintained The embodiment illustrated in FIGS. 9–11 functionally corresponds to the previous, with the exception that when the piston 6b is displaced by means of the driving means 10b, the displacement force is transferred to the spit 2b not by means of any spacing member inside the cylinder 5b or the sleeve 15b but via the connecting member 21.

In the description of the variant shown in FIGS. 12 and 13, the same designations as before are used with the addition of the letter c specific for the embodiment. In contrast to the previous embodiment, the cylinder 5c is here stationary, i.e. connected to the framework of the device in a rigid manner. In the same way as in the embodiment according to FIG. 9–11, the piston 6c and the spit 2c are mutually connected by means of a mechanical connecting means 4c. In this embodiment, there is also a sleeve 15c, but here it is not stationarily connected to the frame work of the device but instead movable in relation to the cylinder 5c. To be more precise, the sleeve 15c is freely movable in the space formed between the spit 2c and the piston 6c on one hand and the inside of the cylinder 5c on the other hand. The piston 6c comprises a stop member 24 acting as stop for the sleeve 15c. In the starting position for filling, the components take the position according to FIG. 12, in which the sleeve 15c is located about the spit 2c and occupies essentially the whole of or at least the major part of the space which is intended to be filled with food mass. The collar 3c of the spit 2c is sealingly received inside the cylinder 5c. When mass is now supplied via the filler hole 8c, the sleeve 15c will be subjected to the mass pressure and forced to slide in the direction towards the stop member 24 of the piston 6c under gradual liberation of the space about the mass receiving section 13c of the spit. Consequently, the increasing volume of the mass about the section 13c will be compensated for by displacement of the sleeve 15c. In this connection it should be pointed out that when the sleeve 15c moves to the right in FIG. 12, air is allowed to escape from the space on the outside of the piston 6c via axial channels formed in the stop member 24. When the space outside the section 13c is filled with mass, the sleeve 15c comes into contact with the stop member 24. Whereupon the spit 2c is pushed out of the cylinder 5c by means of the driving means 10c to the position illustrated in FIG. 13. The spit 2 is there located essentially outside the cylinder 5c and can be released by lifting its rod 1c out of engagement with the yoke arranged on the connecting member 4c at the rod 1c.

In the variant illustrated in FIGS. 14 and 15, the letter d specific for the embodiment is used The embodiment according to FIGS. 14 and 15 corresponds to that of FIGS. 12 and 13, with the exception that no connecting member is here provided on the outside of the cylinder 5b for mechanically connecting the spit 2d and the piston 6d, but instead a spacing member 4d is here used for making it possible for the piston 6d, with the aid of its driving means 10d, to push the spit 2d out of the cylinder 5d when the filling of food mass is completed. It is pointed out that in the embodiment according to FIGS. 14 and 15, the spit 2d exerts a larger resistance than the sleeve 15d to displacement directed to the left in FIG. 14, which secures that it is the sleeve 15d which from its starting position illustrated in FIG. 14 will be displaced in a direction to the right during the gradual filling of mass. As need arises, a suitable member could however be added so as to constitute a holder-on against displacement of the spit 2d to the left in FIG. 14 during filling.

Figure 16:
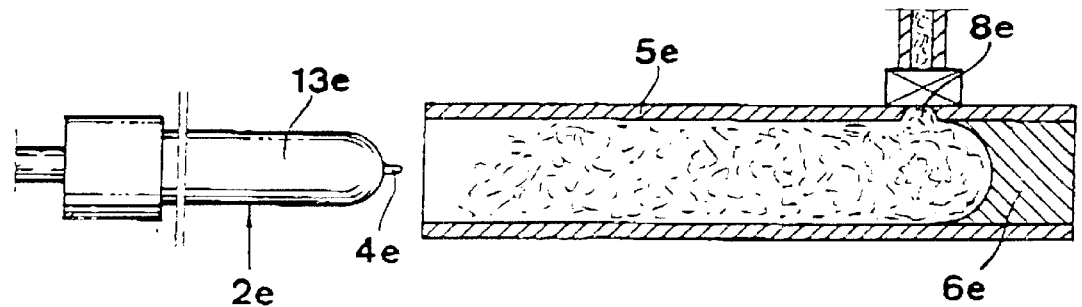
FIGS. 16 and 17 are views partly in longitudinal section and in side view illustrating a modified embodiment of the invention.
Figure 17:
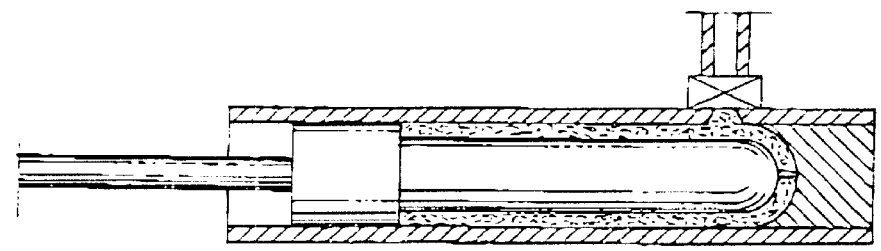

In FIGS. 16 and 17, the letter e specific for the embodiment is used. This embodiment connects on to that already described with the aid of FIGS. 1–5. Here, the embodiment is meant to be either such that the food mass is introduced into the cylinder 5e with a volume at least corresponding to that the eventually required, whereupon the spit 2e is pressed into the cavity of the cylinder 5e under formation of the mass about the section 13e of the spit. The embodiment can thereby be such that surplus mass is pressed back via the filler holes 8e or, in addition, the wall of the cylinder 5e comprises a further outlet for surplus mass. Here, as well, the spit 2e comprises a spacing member 4e for establishment of an interspace relative to the piston 6e. As soon as the spit 2e with its spacing member 4e has come into contact with the piston 6e and the mass has been formed about the section 13e, the spit with its associated mass can be pushed out by moving the piston 6e in a direction towards the left from the position illustrated in FIG. 17. However, the embodiment according to FIGS. 16 and 17 can also be realised such that, in a starting position, the spit 2e is located inserted into the cylinder 5e in a desired filling position, the piston 6e being displaced in a direction to the right in FIGS. 16 and 17. When the required volume of mass has been introduced, the piston 6e can now, at the same time as the spit 2e is kept immovable in the cylinder 5e, be moved to the left so as to compress the mass about the section 13e, while the surplus mass can escape in ways which have previously been described. Finally, the spit 2e with its associated mass is pushed out of the cylinder 5e by means of the piston 6e, which in conformity with the previous embodiments is meant to be connected to a driving means, even though such a driving means has not been illustrated in FIGS. 16 and 17.

Figure 18:
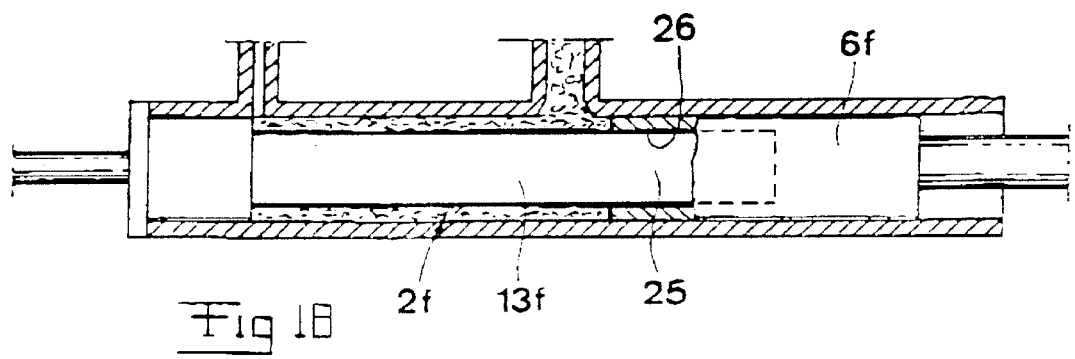
FIG. 18 is a view similar to FIG. 3 but showing a further possibility of modification.

In FIG. 18, a variant is illustrated where the designations have been provided with the letter f specific for the embodiment.

In the embodiment according to FIG. 18, it is intended to be illustrated that the space between the piston 6f and the spit 2f, designated with number 19 in the previous embodiments, is no more at hand. Instead, the spit 2f here comprises a section 25 protruding in the extension of the food mass receiving section 13f, which section 25 is received in a corresponding cavity 26 formed in the piston 6f. The section 25 and the cavity 26 are complementary formed so that no free space for food mass arises. Since the section 25 is closely received in the cavity 26 in the piston 6f, the section 25 will not receive any food mass coating. Consequently, the section 25 will be completely liberated after removal of the spit 2f, which implies that the section 25 can be used as a supporting member so as to make it possible to place the spit on supporting sections at both of the ends of the spit 2f so that the section 13f which comprises food mass is located above a grill bed or any other treatment station. Consequently, the spit 2f according to FIG. 18 does not have to be supported only via the rod 1, such as the case must be in the previously described embodiment, since there the food product encloses the outer ends of the section 13. Expressed in other words, the food product formed about the spit 2f in the embodiment according to FIG. 18 will consequently obtain the shape of a hollow cylinder having both ends open. The connection between the section 25 of the spit 2f and the bottom of the recess 26 of the piston 6f arising in FIG. 18 implies, of course, that. when the spit 6f is displaced to the left in FIG. 18, the spit 2f will be pushed out of the cylinder 5f as previously described with reference to the embodiment according to, for instance, FIGS. 1–4. Also for the rest, the functioning of the embodiment according to FIG. 18 is intended to be analogous to the functioning of the embodiment which has been described with reference to FIGS. 1–4.

Figure 19:
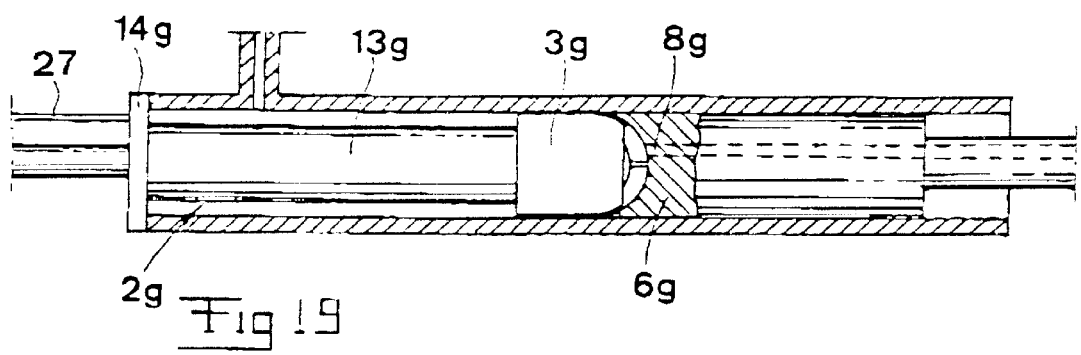
FIGS. 19 and 20 are views similar to FIG. 3 of a further variant.
Figure 20:
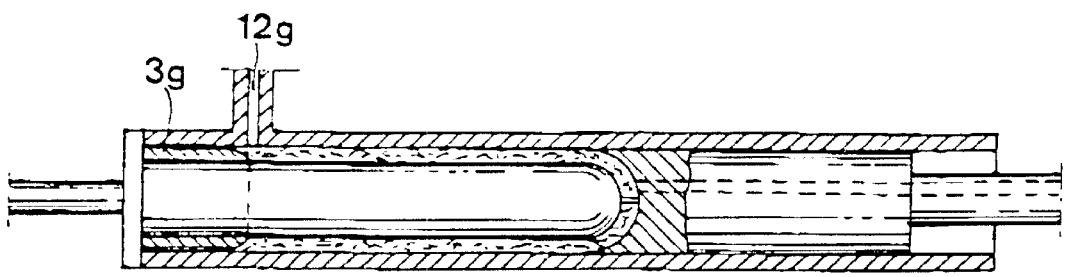

In FIGS. 19–20, a variant is illustrated where the designations have been provided with the letter g specific for the embodiment. This variant differs from the embodiment illustrated in FIGS. 1–4 in two notable respects:

Firstly, the supplying of food mass here takes place via an opening 8g in the side of the piston 6g facing the space which is to be filled with food mass. The opening 8g leads to a channel longitudinally arranged in the piston, indicated with dashed lines. Secondly, the collar 3g is here displaceably arranged on the section 13g of the spit 2g. The collar 13g has the character of a piston-like sleeve, which under the influence of the pressure from the food mass being introduced, is intended to be moved under gradual liberation of this space. In a starting position for filling, shown in FIG. 19, the collar 3g is pushed forward as close to the opening 8g as possible. For pushing the collar 3g forward to this position, an operating member 27 can be used, for instance a bar, which in the example is intended to pass through a hole in the flange 14g so as to contact the collar 3g at the end of the collar which is facing away from the piston 6g. In this advanced position of the collar 3g, the part of the space which is to be filled with food mass and which is in communication with the opening 8g is very small. This implies that a very small air volume is present there.

When food mass now is supplied via the opening 8g, the collar 3g will be affected thereby and will move in a direction to the left under gradual liberation, for reception of mass, of the part of the space available between the collar 3g and the piston 6g. Finally, the collar 3g reaches the left end position illustrated in FIG. 20, in which the collar contacts the flange 14g. The space about the spit 2g is then filled with mass. The small initial volume of air can now escape in the previously described manner, for instance through the opening 12g in the wall of the cylinder or through axial channels in the collar 39. When the collar 3g moves from the position according to FIG. 19 towards the position according to FIG. 20, it will displace air, which will pass out through the opening 12g and/or further possible openings being provided in the flange 14g. Consequently, the embodiment according to FIGS. 19 and 20 implies that food mass is supplied to a space, which during the supplying gradually increases in volume. Consequently, the collar 3g basically has the same function as the previously described sleeve 15.

Of course, the invention is not only limited to the embodiments exemplified above. Several detail modifications can consequently be performed by ordinary men skilled in the art as soon as the basic idea of the invention has been presented Once again it is emphasised that the cross-sectional shape of the inner cavity of the cylinder 5 and the periphery of the spit 2 and the piston 6 can be other than circular. Consequently, the inner cavity of the cylinder 5 can be polygonal in cross-section, for instance rectangular, in which case a sleeve 15, which might be present, must have a corresponding external shape. When the sleeve 15 is present, its inner cavity can have an arbitrary shape and the periphery with a shape that 6 can be formed in correspondence thereto. When no sleeve 15 is present, the piston 6 should have a periphery with a shape that corresponds to the inner shape of the cylinder 5. Consequently, this implies that the food product formed about the section 13f obtains an external shape being correspondingly polygonal, for instance rectangular. The cross-sectional shape of the food mass receiving section 13 of the spit can also have other arbitrary shapes than a circular depending on the desires. With reference to the embodiment according to FIG. 18, it is pointed out that the spit 2f there can have an almost flat-like or leave-like shape, the plane of which being in the drawing plane. The recess 26 in the piston 6f would then be slot-shaped. If the cavity of the cylinder is formed for uniform thickness of the mass about the spit, the final food product will then be flat with an inner slot-like cavity. The periphery of the collar 3 of the spit is for sealing purposes formed in correspondence with the inside of the cylinder 5. Even if, in a more industrial scale, it is suitable that special driving means are used for moving the components of the device relative to each other, the power need required according to the invention can in more simple embodiments of the device be satisfied by providing the parts which are to be moved with handles or other gripping means making it possible for the users of the device to manually effectuate the movements. It is pointed out that even though it is put forward as a possible embodiment that the rod of the spit is releasably connected to the piston via a connecting member 4c by the rod 1c being placed in a yoke of the connecting member 4c, as shown in FIGS. 12 and 13, other connecting methods are also possible as long as the required mutual co-ordination of the movements of the spit and the piston is obtained.

It is further pointed out that it is not necessary for the food mass to be introduced into the space between the cylinder and the spit via a filler hole arranged in the wall of the cylinder. Instead, it is just as possible for the food mass to be introduced into the space through a channel passing in the spit. Such an inlet channel could moreover, as an alternative, be formed in the piston 6. It would even be possible, in an embodiment comprising the sleeve 15, to introduce the food mass in the space through channels formed in the sleeve itself. Expressed in other words, it is consequently sufficient for the realisation of the idea of the invention that the food mass is supplied to the space via any of the components which takes part in delimiting the space intended for the food mass. Finally, it is pointed out that the collar could be displaceable along the spit and be fixable at desired positions in order to vary the length of prepared food products.

What is claimed is:

1. A device for forming a food mass on a spit (2) for preparation of a hollow food product, which device comprises a cylinder (5) having a cavity and said spit about which the food mass is to be formed, the cylinder and the spit being movable relative to each other along the longitudinal axis of the cylinder, and means (8) for introducing the food mass into a space formed between the spit and the inner wall of the cylinder, characterized in that, the device comprises a piston (6) receivable in the cavity of the cylinder (5), the piston (6) and the cylinder (5) are relatively movable in the longitudinal direction of the cylinder, the cylinder (5) and an assembly consisting of said spit and piston (6) are movable relative to each other in the longitudinal direction of the cylinder (5) between at least two positions, namely a first position, in which the space about the spit is located at least partially in the cavity of the cylinder (5) so as to be filled with food mass, and a second position, in which the spit is located at least partly liberated by the cylinder (5) for removal of the spit (2) with its associated food product, and the spit (2) comprises a collar (3), the periphery of which is arranged to connect to the inner surface of the cavity of the cylinder (5), and said collar delimits such a spit section (13) that is arranged to receive food mass about itself.

2. A device for forming a food mass on a spit (2) for preparation of a hollow food product, which device comprises a cylinder (5) having a cavity and said spit about which the food mass is to be formed, the cylinder and the spit being movable relative to each other along the longitudinal axis of the cylinder, and means (8) for introducing the food mass into a space formed between the spit and the inner wall of the cylinder, characterized in that, the device comprises a piston (6) receivable in the cavity of the cylinder (5), the piston (6) and the cylinder (5) are relatively movable in the longitudinal direction of the cylinder, the cylinder (5) and an assembly consisting of said spit and piston (6) are movable relative to each other in the longitudinal direction of the cylinder (5) between at least two positions, namely a first position, in which the space about the spit is located at least partially in the cavity of the cylinder (5) so as to be filled with food mass, and a second position, in which the spit is located at least partly liberated by the cylinder (5) for removal of the spit (2) with its associated food product, and additionally comprising means (4) for maintaining a predetermined relation between the spit and the piston during and/or after the application of the food mass about the spit.

3. A device for forming a food mass on a spit (2) for preparation of a hollow food product, which device comprises a cylinder (5) having a cavity and said spit about which the food mass is to be formed, the cylinder and the spit being movable relative to each other along the longitudinal axis of the cylinder, and means (8) for introducing the food mass into a space formed between the spit and the inner wall of the cylinder, characterized in that, the device comprises a piston (6) receivable in the cavity of the cylinder (5), the piston (6) and the cylinder (5) are relatively movable in the longitudinal direction of the cylinder, the cylinder (5) and an assembly consisting of said spit and piston (6) are movable relative to each other in the longitudinal direction of the cylinder (5) between at least two positions, namely a first position, in which the space about the spit is located at least partially in the cavity of the cylinder (5) so as to be filled with food mass, and a second position, in which the spit is located at least partly liberated by the cylinder (5) for removal of the spit (2) with its associated food product, and additionally comprising a sleeve (15, 3g), which is receivable in the cavity of the cylinder (5), the sleeve and the cylinder are relatively movable in the longitudinal direction of the cylinder and the sleeve, the food mass receiving section (13) of the spit is receivable in the sleeve with a relative mobility between the spit and the sleeve, and the sleeve (15, 3g) is arranged to gradually liberate, during the filling of food mass, the space about the spit intended for receipt of the food mass, under relative movement between the sleeve (15, 3g) and the spit (2).

4. A device according to claim 3, characterized in, that the sleeve (15) is arranged to occupy, in a starting position for filling of food mass, essentially the whole of or at least a considerable part of the space between the spit and the cylinder which is intended for receipt of mass about the spit.

5. A device according to claim 1, characterized in, that the sleeve (3g) consists of the collar of the spit, which collar is movable along the spit.

6. A device according to claim 1, characterized in that a filler hole (8) for filling of food mass to the ring-shaped space about the spit (2) is provided in at least one of the following:
(a) the cylinder,
(b) the spit,
(c) the piston, or
(d) the sleeve.

7. A device according to claim 2, characterized in, that the. means (4b, 4c) for maintaining a predetermined relation between the spit and the piston is arranged to mechanically connect them in a disengageable manner.

8. A device according to claim 2, characterized in, that the means (4, 4a, 4d) for maintaining a predetermined relation between the spit and the piston comprises mutually contacting surfaces of the spit and the piston, which surfaces are arranged to transfer a compressive force but not a tensile force between each other.

9. A device according to claim 2, characterized in, that the means (4, 4a, 4d) for maintaining a predetermined relation between the spit and the piston is arranged to form, between the spit and the piston and at one end of the spit, an interspace (19) intended for receipt of food mass, so as to achieve that the food product formed about the spit will be provided with a closed end at said end of the spit.

10. A device according to claim 8, characterized in, that the means for maintaining a predetermined relation between the spit and the piston comprises a spacing member (4, 4a, 4d) operating between the spit and the piston.

11. A device according to claim 10, characterized in, that the spacing member (4, 4a, 4d) has a cross-section area which is essentially smaller than the cross-section area of the section (13) of the spit which is intended to receive food mass about itself.

12. A device according to claim 1, characterized in, that the cylinder, the spit and/or the piston comprise one or several openings (12) for evacuation of air, during the filling of the food mass, from the space about the spit intended for receipt of food mass.

13. A device for forming a food mass on a spit (2) for preparation of a hollow food product, which device comprises a cylinder (5) having a cavity and said spit about which the food mass is to be formed, the cylinder and the spit being movable relative to each other along the longitudinal axis of the cylinder, and means (8) for introducing the food mass into a space formed between the spit and the inner wall of the cylinder, characterized in that, the device comprises a piston (6) receivable in the cavity of the cylinder (5), the piston (6) and the cylinder (5) are relatively movable in the longitudinal direction of the cylinder, the cylinder (5) and an assembly consisting of said spit and piston (6) are movable relative to each other in the longitudinal direction of the cylinder (5) between at least two positions, namely a first position, in which the space about the spit is located at least partially in the cavity of the cylinder (5) so as to be filled with food mass, and a second position, in which the spit is located at least partly liberated by the cylinder (5) for removal of the spit (2) with its associated food product, and the piston is provided with a hollow space (26) for receiving a section (25) of the spit (2f).

14. A device according to claim 1, characterized in that the cylinder (5, 5a, 5d) is stationarily arranged whereas the spit and the piston are movable in the cylinder.

15. A device according to claim 1, characterized in that the cylinder (5b, 5f) is displaceable in its longitudinal direction.

16. A device according to claim 3, characterized in, that the sleeve (15c, 15d, 3g) is displaceable relative to the stationarily arranged cylinder.

17. A device according to claim 3, characterized in, that the sleeve (15, 15b) is stationarily arranged and that the cylinder is displaceable relative to the sleeve.

18. A device according to claim 1 characterized in, that a driving means is connected to at least one of the following for generation of moving power:
(a) the piston,
(b) the spit,
(c) the cylinder, and/or
(d) the sleeve.

* * * * *